United States Patent [19]
Yamaguchi

[11] Patent Number: 5,396,056
[45] Date of Patent: Mar. 7, 1995

[54] NON-CONTACT IC CARD HAVING AN ACTIVE ATTENUATION CIRCUIT

[75] Inventor: Atsuo Yamaguchi, Itami, Japan

[73] Assignee: Mitsubishi Denki Kabushiki Kaisha, Tokyo, Japan

[21] Appl. No.: 197,866

[22] Filed: Feb. 17, 1994

Related U.S. Application Data

[60] Division of Ser. No. 892,410, Jun. 1, 1992, Pat. No. 5,308,968, which is a continuation of Ser. No. 575,807, Aug. 31, 1990, abandoned.

[30] Foreign Application Priority Data

Mar. 13, 1990 [JP] Japan ................... 2-59929

[51] Int. Cl.⁶ ................ G06K 19/067; H01H 36/00
[52] U.S. Cl. ................... 235/492; 235/439
[58] Field of Search .......... 235/492, 439, 380, 449; 395/800; 307/102, 104, 116, 117; 340/825.54

[56] References Cited

U.S. PATENT DOCUMENTS

| | | | |
|---|---|---|---|
| 3,627,993 | 12/1971 | Cooper, Jr. | 235/439 |
| 4,644,321 | 2/1987 | Kennon | 340/310 A |
| 4,818,855 | 4/1989 | Mongeon et al. | 235/440 |
| 4,845,347 | 7/1989 | McCrindle et al. | 235/380 |
| 4,926,996 | 5/1990 | Eglise et al. | 194/212 |
| 5,013,898 | 5/1991 | Glasspool | 235/449 |
| 5,226,167 | 7/1993 | Yamaguchi | 235/449 |

FOREIGN PATENT DOCUMENTS

| | | |
|---|---|---|
| 2458953 | 1/1981 | France . |
| 2500944 | 9/1982 | France . |
| 54-13719 | 1/1979 | Japan . |

OTHER PUBLICATIONS

"Non-Contact IC Card Employing Light Communication", 1988, Nikki Electronics, pp. 197–202.

Primary Examiner—Davis L. Willis
Assistant Examiner—Edward Sikorski
Attorney, Agent, or Firm—Leydig, Voit & Mayer

[57] ABSTRACT

The present invention provides a microcomputer in which an input signal is input via a resonance circuit, a CPU for processing data, an input circuit for detecting the input signal, a decoding circuit for demodulating the input signal and supplying a demodulated signal of a predetermined length to the CPU when the input circuit detects the input signal, an attenuation circuit for attenuating oscillation in the resonance circuit when said input circuit detects the input signal, and an output circuit for outputting an output signal from the CPU. A non-contact IC card utilizing the microcomputer includes an antenna circuit for transmitting and receiving data and incorporating the resonance circuit.

6 Claims, 8 Drawing Sheets

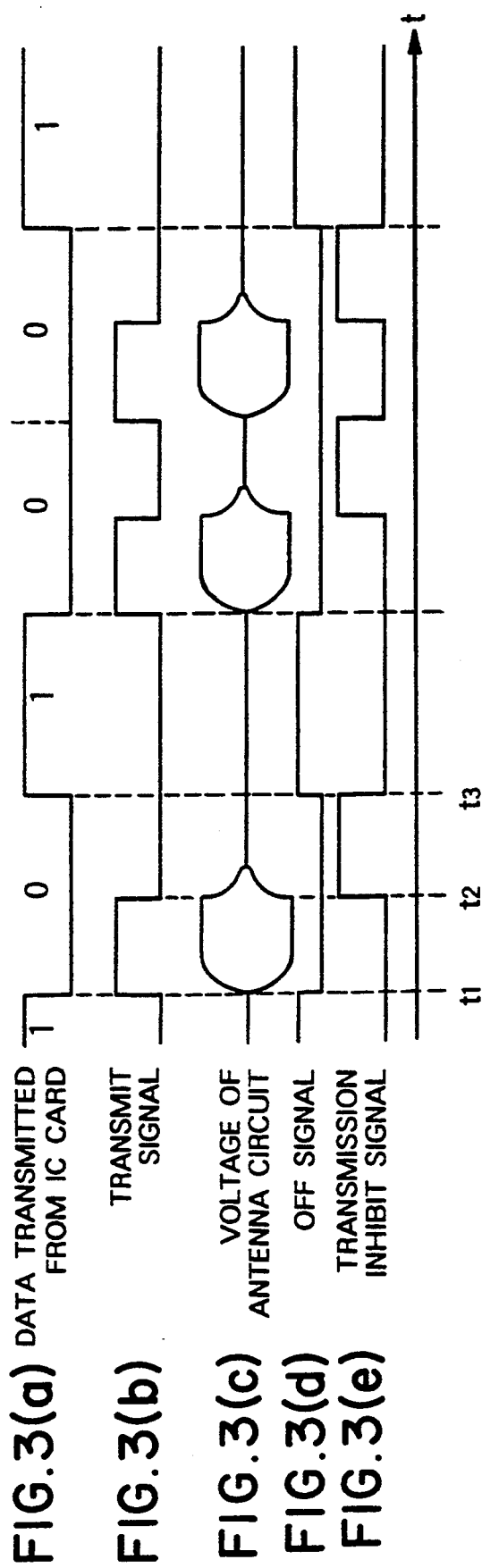

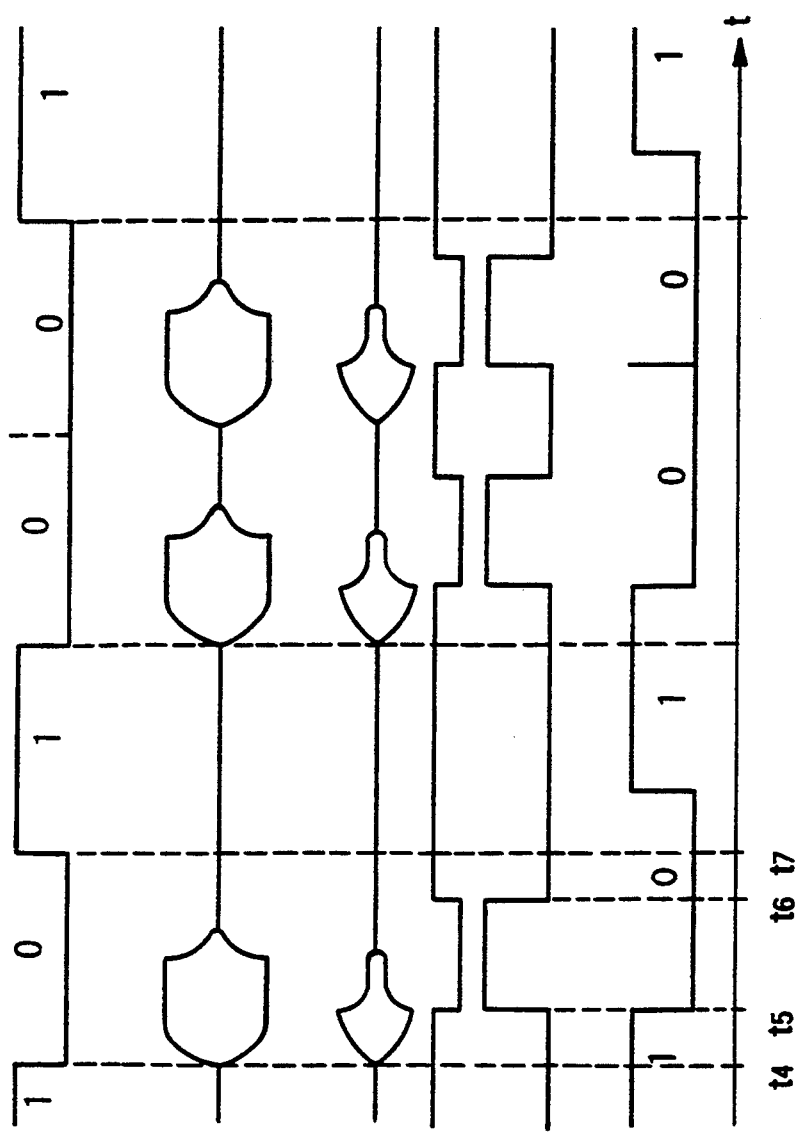

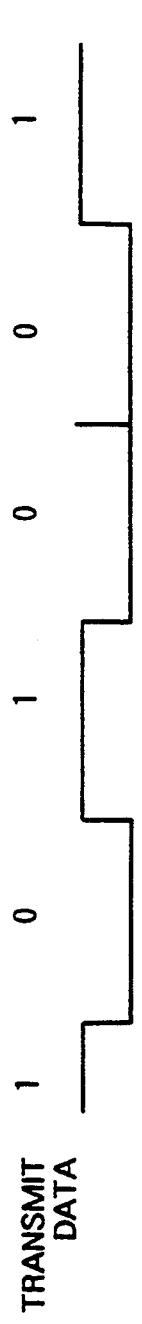
FIG.7(a) (PRIOR ART) TRANSMIT DATA
FIG.7(b) (PRIOR ART) ELECTROMAGNETIC WAVE
FIG.7(c) (PRIOR ART) VOLTAGE OF RECEIVING ANTENNA
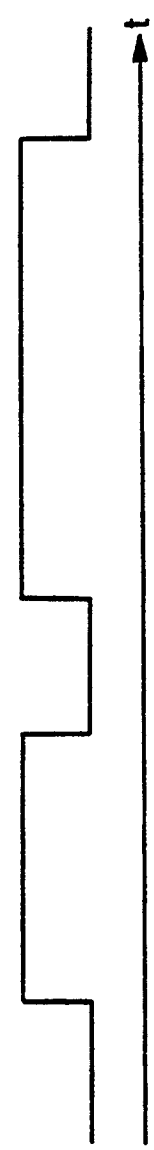
FIG.7(d) (PRIOR ART) DEMODULATED DATA

NON-CONTACT IC CARD HAVING AN ACTIVE ATTENUATION CIRCUIT

This disclosure is a division of application Ser. No. 07/892,410, filed Jun. 1, 1992, now U.S. Pat. No. 5,308,968, which is a continuation application of application Ser. No. 07/575,807, filed Aug. 31, 1990, now abandoned.

BACKGROUND OF THE INVENTION

1. Field of the Invention

The present invention relates to a microcomputer and to a non-contact IC card using the microcomputer.

2. Description of the Related Art

FIG. 5 illustrates the construction of a conventional non-contact IC card. A ROM 2a, a RAM 2b, a transmitting circuit 3 and a receiving circuit 4 are connected to a CPU 1. A microcomputer 5 comprises these components. A data transmitting antenna 6 and a data receiving antenna 7 are respectively connected to a transmitting circuit 3 and a receiving circuit 4 of the microcomputer 5. A battery 8 and an oscillator 9 are connected to the CPU 1. Further, the entire IC card is sealed with resin or the like in order to improve environmental resistance.

The CPU 1 is supplied with a power-supply voltage from the battery 8 and with a clock signal from the oscillator 9. With these components, the CPU 1 operates based on programs previously stored in the ROM 2a. This IC card transfers data to and from the outside by using electromagnetic waves. On the one hand, when data is received, electromagnetic waves from the outside are received by the receiving antenna 7, and input into the CPU 1 after it has been demodulated into data by the receiving circuit 4. Further, data processing is performed in the CPU 1 and the data is stored as required in the RAM 2b. On the other hand, when data is transmitted, it is output from the CPU 1 to the transmitting circuit 3, and is transmitted from the transmitting antenna 6 after a carrier has been modulated by the data in the transmitting circuit 3.

FIG. 6 illustrates a circuit diagram of the receiving circuit 4. A capacitor 11 is connected to the receiving antenna 7. The receiving antenna 7 and the capacitor 11 define a resonance circuit 12 so as to selectively receive electromagnetic wave of a specific frequency. A first input of a comparator 13 for confirming whether or not data is being received is connected to the resonance circuit 12. Resistors 14, 15 for determining a reference voltage of the comparator 13 are connected to a second input of the comparator 13. The output of the comparator 13 is connected to the CPU 1 via a diode 16. Furthermore, a capacitor 17 and a discharge resistor 18 are connected to the output of the diode 16.

Further, as shown in FIGS. 7(a)–7(d), when the data of FIG. 7(a) is transmitted from an external unit to the IC card, the electromagnetic waves are received by the receiving antenna 7, and a generated voltage shown FIG. 7(c) from the receiving antenna 7 is input to the comparator 13. The data of FIG. 7(d) is demodulated in the comparator 13, and the demodulated data is input from there to the CPU 1 through the diode 16.

Since the receiving antenna 7 and the capacitor 11 comprise the resonance circuit 12, the generated voltage at the receiving antenna 7 cannot rise or fall sharply, but instead rises and falls gradually. For this reason, as shown in FIG. 7, the width of the demodulated data varies greatly owing to the magnitude of a detect level in the comparator 13 and of the generated voltage of the receiving antenna 7 and the like. This leads to a problem in that it becomes difficult to accurately receive the data. Moreover, variations in the detect level of the comparator 13 are caused by variability in the production of the IC card, and the generated voltage at the receiving antenna 7 varies greatly according to the distance between the external unit and the IC card.

Particularly, when data transmission intervals become short, despite no electromagnetic wave being received, a voltage remains in the resonance circuit 12, causing possible mis-reception.

SUMMARY OF THE INVENTION

It is an object of the present invention to overcome the above-mentioned problem, and to provide a microcomputer in which data can be accurately input via a resonance circuit.

Another object of the invention is to provide a non-contact IC card which permits accurate data reception by using such a microcomputer as described above.

The present invention provides a microcomputer in which an input signal is entered via a resonance circuit, comprising: a CPU for processing data; a resonance circuit for receiving an external signal and generating an input signal in response; an input circuit connected to said resonance circuit for detecting the input signal; a demodulating circuit connected to said input circuit for demodulating the input signal and outputting a demodulated signal of a predetermined length to said CPU when said input signal of detects the input signal; an active attenuating circuit connected to said resonance circuit for attenuating oscillation of electrical signals in said resonance circuit when said resonance circuit receives an external signal; and an output circuit connected to said CPU and to said resonance circuit for outputting a transmit signal generated by said CPU to said resonance circuit.

The attenuation circuit may be constructed so that it returns the output voltage of the resonance circuit to the resonance circuit in the form of feedback.

Further, the output circuit may be constructed so that the output signal is output to the resonance circuit. The attenuation circuit may be constructed so that it attenuates oscillation in the resonance circuit, when the output signal which is output from the output circuit to the resonance circuit changes from an ON state to an OFF state.

Furthermore, the present invention provides a non-contact IC card, comprising: an antenna circuit for transmitting and receiving data to and from the outside; a CPU for processing data; a receiving circuit for detecting a receive signal received by the antenna circuit; a decoding circuit for inputting a demodulated signal of a predetermined length to the CPU, when the receiving circuit detects the receive signal; an attenuation circuit for attenuating oscillation in the antenna circuit, when the receiving circuit detects the receive signal; and a transmitting circuit for transmitting a transmit signal via the antenna circuit from the CPU to the outside.

In a microcomputer according to the present invention, once the input circuit detects an input signal, the decoding circuit inputs a demodulated signal of a predetermined length into the CPU, whereas the attenuation circuit attenuates oscillation in the resonance circuit.

Further, in a non-contact IC card according to the present invention, once the receiving circuit detects a receive signal, the decoding circuit inputs a demodulated signal of a predetermined length into the CPU, while the attenuation circuit attenuates oscillation in the antenna circuit.

Other features and advantages of the present invention will become apparent from the following Description of the Preferred Embodiments when read with reference to the attached drawings.

BRIEF DESCRIPTION OF THE DRAWINGS

FIGS. 3(a)-3(k) are signal waveform charts of the circuits shown in FIG. 2 during both transmission and reception;

FIGS. 7(a)-7(d) are a signal waveform chart illustrating the operation of the circuit of FIG. 6.

DESCRIPTION OF THE PREFERRED EMBODIMENTS

Embodiments of the present invention will be described hereinafter with reference to the accompanying drawings.

Figure 1:
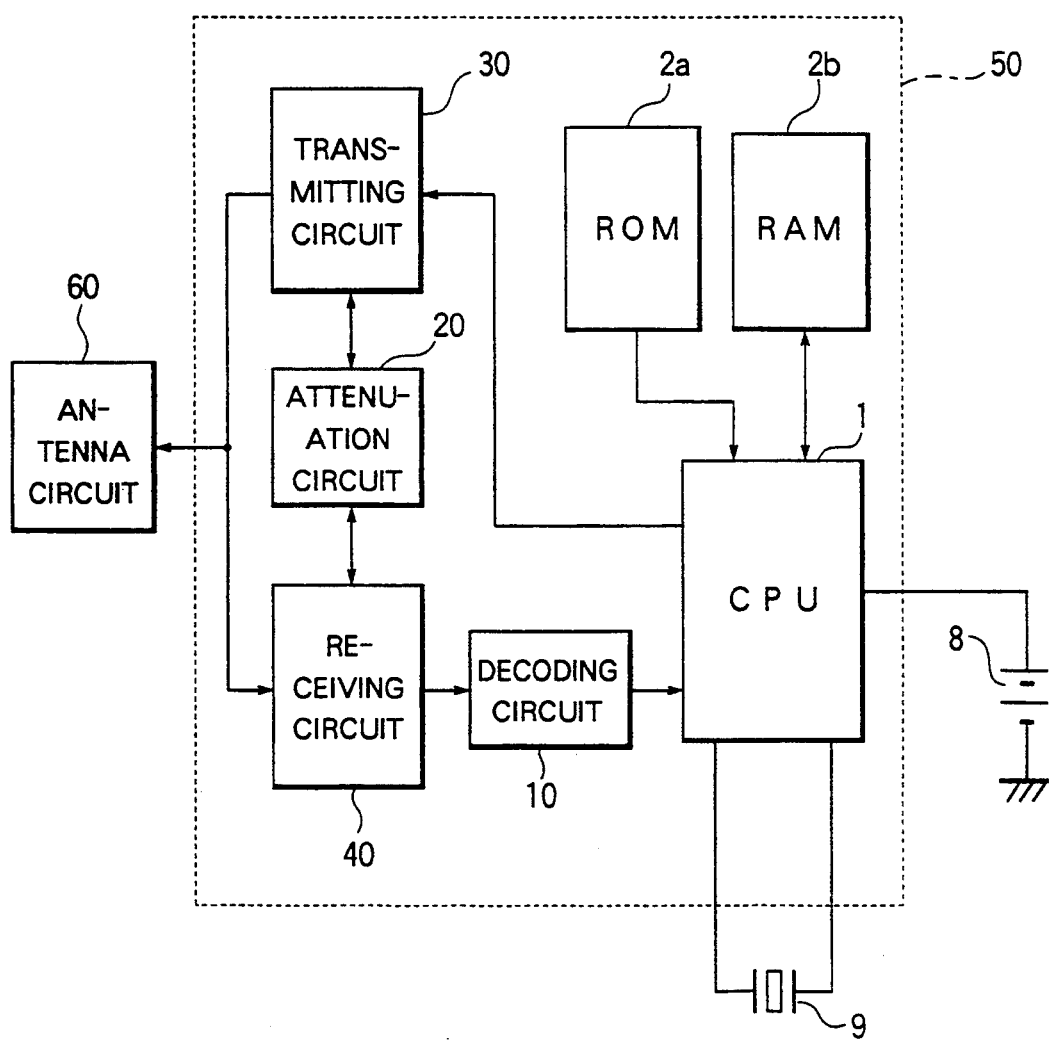
FIG. 1 is a block diagram illustrating an embodiment of a non-contact IC card according to the present invention.

In FIG. 1, a non-contact IC card according to an embodiment of the present invention includes a microcomputer 50, an antenna circuit 60, a battery 8 and an oscillator 9. The microcomputer 50 is formed on a single IC chip, and has a CPU 1 to process data. A ROM 2a, a RAM 2b, a transmitting circuit (output circuit) 30 are connected to the CPU 1, and also a receiving circuit (input circuit) 40 is connected to the CPU 1 through a decoding circuit 10. In addition, an attenuation circuit 20 is connected to both the transmitting circuit 30 and the receiving circuit 40.

The battery 8 and the oscillator 9 are connected to the CPU 1 of the microcomputer 50, and the antenna circuit 60 is connected to the transmitting circuit 30 and the receiving circuit 40.

Programs for operating the CPU 1 are previously stored in the ROM 2a. Further, the entire non-contact IC card is sealed with resin or the like to improve environmental resistance.

Figure 2:
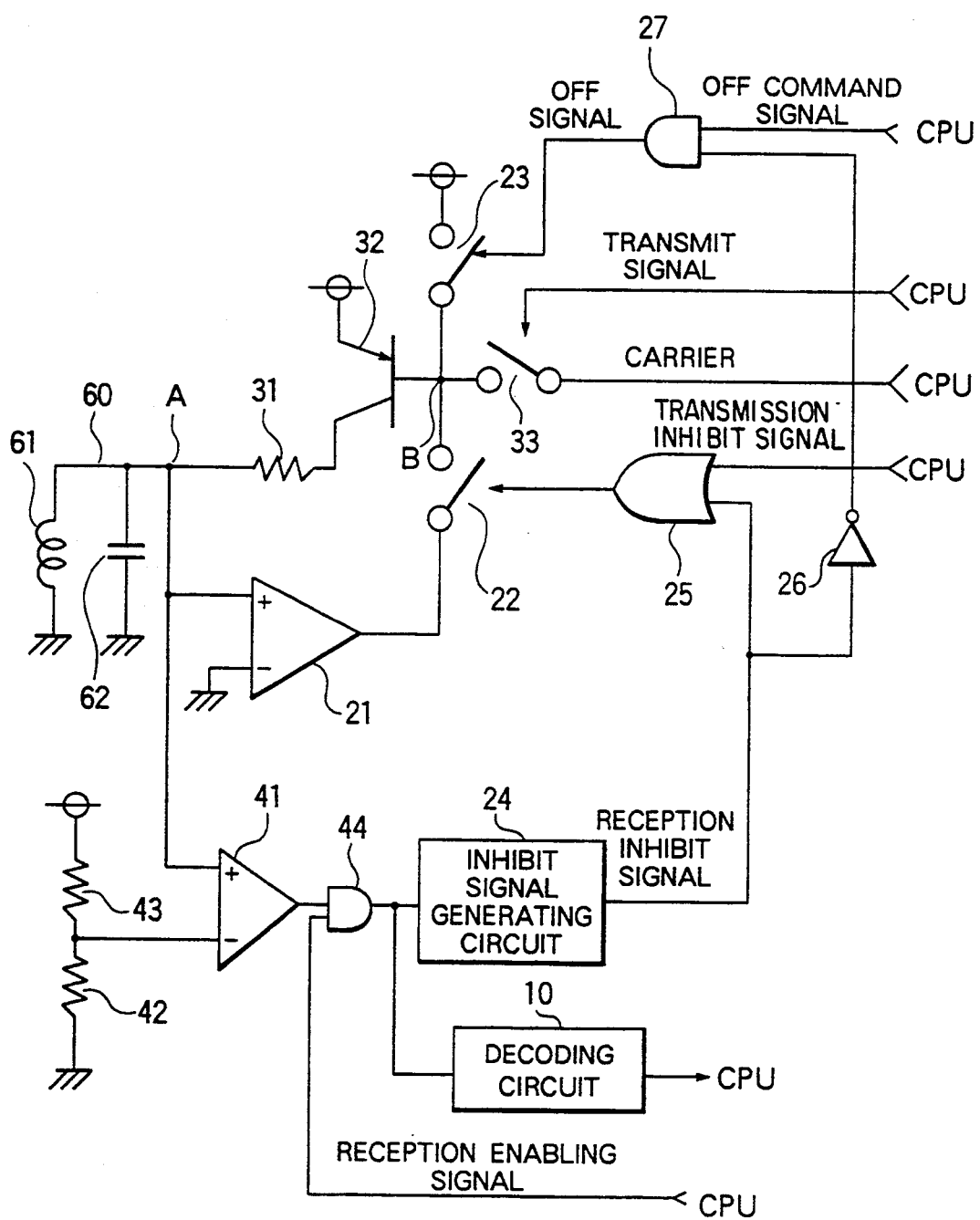
FIG. 2 is a circuit diagram illustrating a receiving circuit, a transmitting circuit and an attenuation circuit inside a microcomputer employed in the invention.

The inside structures of the transmitting circuit 30, the receiving circuit 40 and the attenuation circuit 20 are shown in FIG. 2. An antenna 61 is connected in parallel with a capacitor 62. The antenna 61 and the capacitor 62 define the antenna circuit 60, i.e., the resonance circuit for transmitting and receiving electromagnetic waves of a, predetermined frequency. A switch circuit 33, connected to the CPU 1, is connected to the antenna circuit 60 via a resistor 31 and a transistor 32. A transmit signal from the CPU 1 is input to the control terminal of the switch circuit 33. The transmitting circuit 30 comprises the resistor 31, the transistor 32 and the switch circuit 33.

Further, the first input of a comparator 41 is connected to a node A of the antenna circuit 60 and the resistor 31. Resistors 42, 43 for determining a reference voltage of the comparator 41 are connected to the second input of the comparator 41. The output of the comparator 41 is connected to one input of an AND circuit 44, and a reception-enabling signal is input from the CPU 1 to the other input of the AND circuit 44. The receiving circuit 40 comprises the comparator 41, the resistors 42, 43, and the AND circuit 44.

Furthermore, the first input of a comparator 21 is connected to the node A of the antenna circuit 60 and the resistor 31. The second input of the comparator 21 is grounded, and the output of the comparator 21 is connected via a switch circuit 22 to a node B of the transistor 32 and the switch circuit 33. A switch circuit 23 is connected between the node B and a power line. An inhibit-signal-generating circuit 24 is connected to the output of the AND circuit 44 of the receiving circuit 40. The inhibit-signal-generating circuit 24 outputs a reception inhibit signal at an "H" level of half bit width, when the "H" level signal is input via the AND circuit 44. The output of the inhibit-signal-generating circuit 24 is connected via an OR circuit 25 to the control terminal of the switch circuit 22, and is also connected via an inverter circuit 26 and an AND circuit 27 to the control terminal of the switch circuit 23. The attenuation circuit 20 comprises the comparator 21, the switch circuits 22, 23, the inhibit-signal-generating circuit 24, the OR circuit 25, the inverter circuit 26, and the AND circuit 27.

Moreover, the decoding circuit 10 is connected to the output end of the AND circuit 44 inside the receiving circuit 40. When an input signal from the AND circuit 44 rises from the "L" level to the "H" level, the decoding circuit 10 demodulates receive data (a demodulated signal) "0" of one bit's width to the CPU 1, and otherwise outputs receive data "1" to the CPU 1.

The output signal of the OR circuit 25, the output signal of the AND circuit 27 and a signal transmitted from the CPU 1 control the make and break action of the switch circuits 22, 23, 33, respectively. The switch circuits are constructed so as to be switched off when the signals are at the "L" level.

The operation of the embodiment will now be described with reference to signal waveform charts shown in FIGS. 3A and 3B. The CPU 1 is supplied with a power-supply voltage Vcc from the battery 8 and at the same time with a clock signal from the oscillator 9, and operates based on programs previously stored in the ROM 2a.

In data transmission, as shown in FIG. 3(a), the CPU 1 outputs, with respect to transmit data "0" of one bit, not only a transmit signal shown in FIG. 3(b) which becomes in the first half the "H" level proportional to only a half bit, but also a transmission-inhibit signal of FIG. 3(e) which becomes, in the latter half the "H" level, proportional to only a half bit. At the same time, the CPU 1 outputs an OFF command signal shown in FIG. 3(d) to the AND circuit 27 so that the OFF command signal becomes the "H" level, when both the transmit signal and the transmission-inhibit signal are at the "L" level.

When a transmit signal at the "H" level is output to the transmitting circuit 30 from the CPU 1 at time t1, the transmit signal closes the switch circuit 33, and a carrier is applied to the transistor 32 from the CPU 1. This turns the transistor 32 ON, and the antenna 60 is driven to send electromagnetic wave to the outside.

Because the transmit signal falls to the "L" level at time t2 when a half bit of the transmit data "0" elapses, the switch circuit 33 is opened, and at the same time a transmission-inhibit signal rises from the "L" level to the "H" level, thereby closing the switch circuit 22 through the OR circuit 25. Due to this, the output of the comparator 21 is applied to the transistor 32. At this time in the antenna circuit 60, the oscillation generated during time t1 and t2 tends to be attenuated by repetitive free oscillation. When the oscillation is in a positive half cycle, the output of the comparator 21 assumes the "H" level, so that the transistor 32 enters the OFF state. When the free oscillation in the antenna circuit 60 is, however, in a negative half cycle, the output of the comparator 21 assumes the "L" level, so that the transistor 32 enters the ON state. For these reasons, voltage returns in an antiphase to the antenna circuit 60 in the form of feedback, thereby consuming energy accumulated in the antenna circuit 60. As a result, as illustrated in FIG. 3(c), the oscillation in the antenna circuit 60 becomes rapidly attenuated and stable after time t2.

After this, when the transmit signal and the transmission-inhibit signal assumes the "L" level in correspondence to the transmit data "1" at time t3, an OFF command signal in turn rises from the "L" level to the "H" level. At this time, the reception inhibit signal which is output from the inhibit-signal-generating circuit 24 is at the "L" level due to the no-reception condition, and a signal at the "H" level is input to the AND circuit 27 by means of the inverter circuit 26. Therefore, an OFF signal at the "H" level is applied to the switch circuit 23 from the AND circuit 27. Due to this, the switch circuit 23 is closed, turning the transistor 32 completely OFF.

As has been explained, because of the structure such that when the voltage of the antenna circuit 60 is positive, the transistor 32 is turned OFF, and when it is negative, the driving power of the transistor 32 is increased by using the voltage, free oscillation in the antenna circuit 60 is attenuated in a short period of time, preventing unnecessary oscillation in the transistor 32. A reference voltage for the comparator 21 is desirably set to a slightly negative value close to 0 V so that the transistor 32 does not operate in response to a small degree of oscillation in the antenna circuit 60.

A transmission-inhibit signal may also be formed by inverting a transmit signal.

In data reception, when electromagnetic waves corresponding to data "0" as shown in FIG. 3(f) are transmitted from an external unit (not shown) at time t4, a voltage shown in FIG. 3(h) is generated in the antenna circuit 60 which has received the electromagnetic waves of FIG. 3(g). The voltage is compared in the comparator 41 with a reference voltage which is defined by the resistors 42, 43. Once the generated voltage of the antenna circuit 60 exceeds the reference voltage, a signal at the "H" level is output to the AND circuit 44 from the comparator 41 at time t5. At this time, since a reception-enabling signal at the "H" level, indicating a reception-enabling state from the CPU 1, is input to the AND circuit 44, the output signal from the comparator 41 is input to the inhibit-signal-generating circuit 24 via the AND circuit 44. As a result, a reception inhibit signal shown in FIG. 3(j) having a half bit's width at the "H" level is applied via the OR circuit 25 from the inhibit-signal-generating circuit 24 to the switch circuit 22. Because of this, the switch circuit 22 is closed, and oscillation in the antenna circuit 60 is inhibited in the same manner as in the above-described transmission.

That is, as shown in FIG. 3(h), a voltage generated in the antenna circuit 60 is rapidly attenuated and becomes stable after time t5.

Further, the output of the AND circuit 44 is input to the decoding circuit 10 at time t5, thereby receiving the data "0" of one bit's width being output from the decoding circuit 10 to the CPU 1. Consequently, the received data of FIG. 3(k) is prevented from being distorted by the strength of the electromagnetic waves received.

When the reception inhibit signal falls from the "H" level to the "L" level at time t6, which is the time when a time span proportional to half a bit has elapsed from time t5, a signal at the "H" level is input to the AND circuit 27 via the inverter circuit 26. At this time, the transmit signal and the transmission-inhibit signal are both at the "L" level because of the no transmission condition, and an OFF command signal as shown in FIG. 3(i) at the "H" level is input to the AND circuit 27 from the CPU 1. Therefore, an OFF signal at the "H" level is applied to the switch circuit 23 from the AND circuit 27. Due to this, the switch circuit 23 is closed, turning the transistor 32 completely OFF.

As has been described, the CPU 1 is ready for data reception of the next bit at time t7, and by this time the oscillation in the antenna circuit 60 has already been sufficiently inhibited. That is, the reception voltage of the antenna circuit 60 once returns to a "0" level for each bit, and rises from the "0" level corresponding to received electromagnetic waves. For this reason, the time lag between the time the electromagnetic waves are received and the time the received data is detected becomes constant for each bit, thereby preventing distortion from being generated. Moreover, the data transfer rate can also be increased.

When the received data is input to the CPU 1, the CPU 1 performs data processing based on programs previously stored in the ROM 2a, stores the data in the RAM 2b and transmits the data as required.

Figure 4:
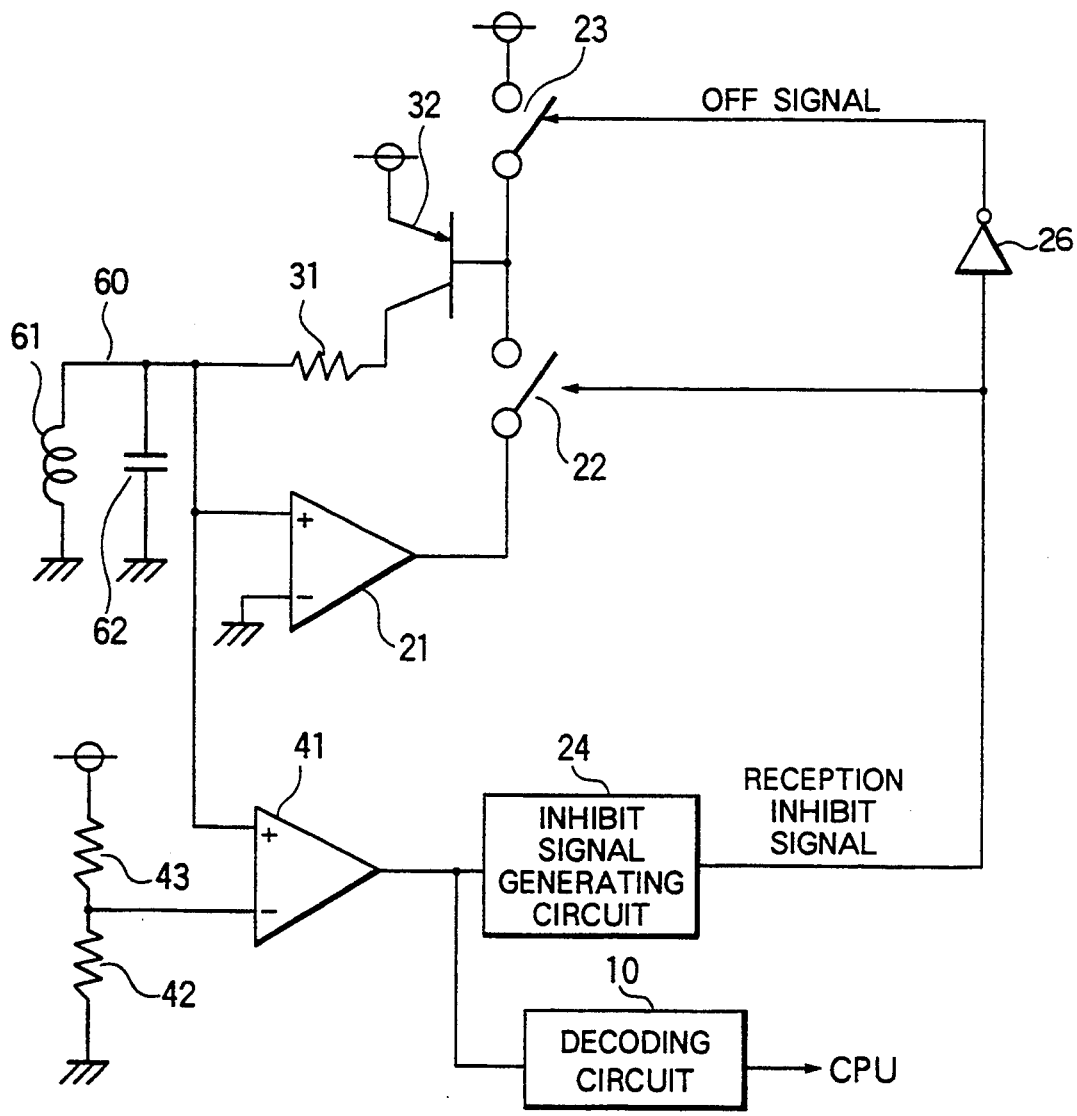
FIG. 4 is a partial circuit diagram showing another embodiment according to the present invention.
Figure 5:
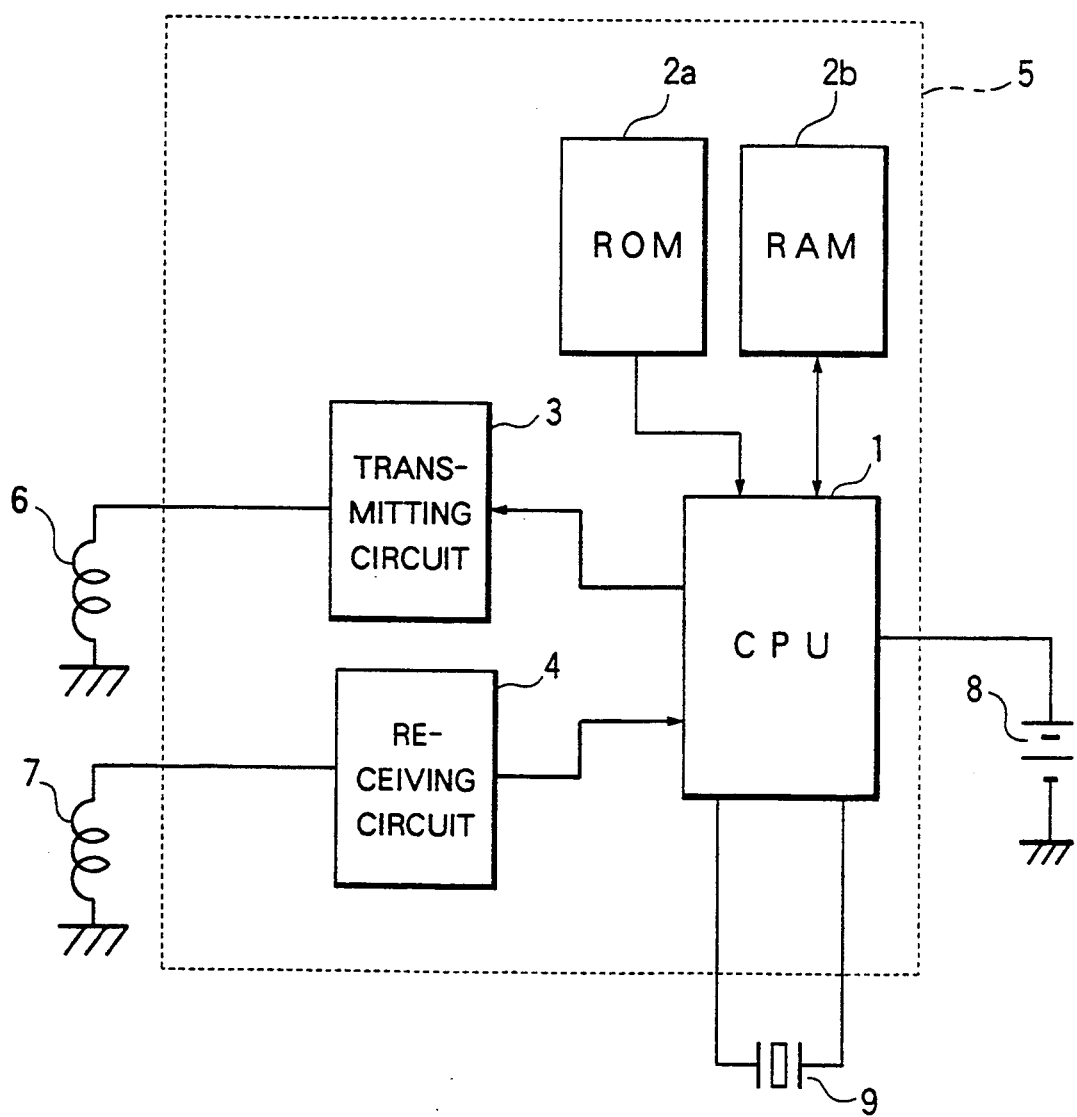
FIG. 5 is a block diagram showing a conventional non-contact IC card.
Figure 6:
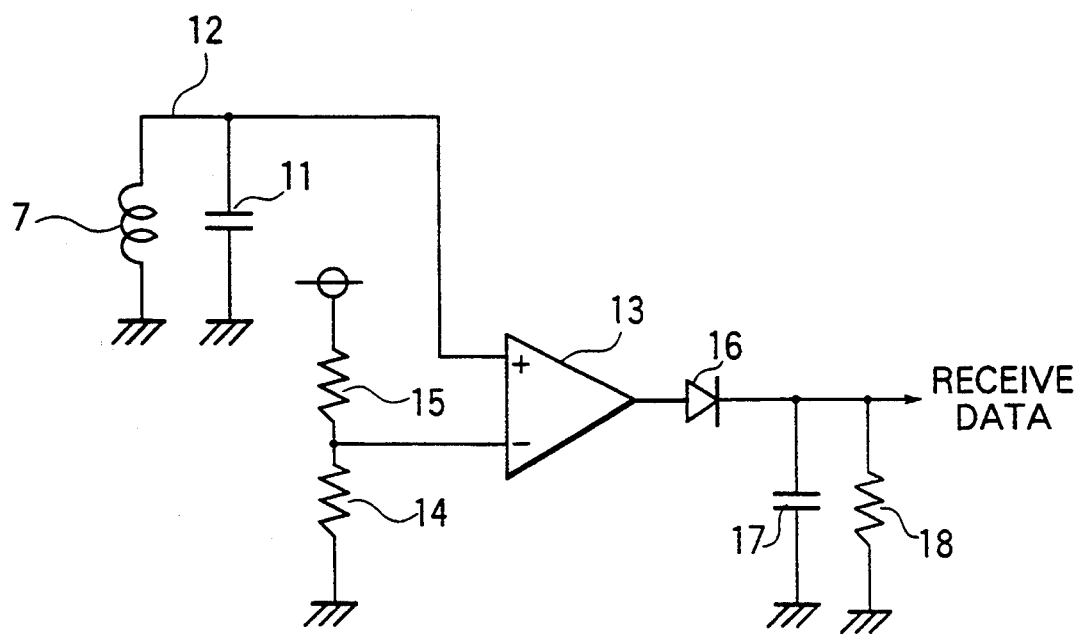
FIG. 6 is a circuit diagram illustrating a receiving circuit inside a microcomputer utilized for the IC card of FIG. 5.

In the above-mentioned embodiment, the antenna circuit 60 is utilized for both transmission and reception. FIG. 4 illustrates a circuit structure in which an antenna circuit for transmission is separately provided, and the antenna circuit 60 is utilized for reception only. In other words, the OR circuit 25, the AND circuits 27, 44, and the switch circuit 33 in the circuitry shown in FIG. 2 are unnecessary. However, the structure as shown in FIG. 2 reduces the area of the chip of the microcomputer 50, when oscillation in the antenna circuit for transmission needs to be attenuated, because the comparator 21, the switch circuits 22, 23, the transistor 32 and the like should be provided in the transmission circuit also.

The invention has been described in detail with particular reference to the preferred embodiments thereof, but it will be understood that variations and modifications of the invention can be made within the spirit and scope of the invention.

What is claimed is:

1. A non-contact IC card comprising:
   an antenna circuit for transmitting and receiving signals and for producing an output signal in response to a received signal;
   a CPU for processing data;
   a receiving circuit connected to said antenna circuit for detecting a receive signal in an output signal produced by said antenna circuit;
   a decoding circuit connected to said receiving circuit for demodulating a receive signal detected by said receiving circuit and outputting a demodulated signal having a predetermined length to said CPU when said receiving circuit detects the receive signal;

an attenuation circuit connected to said receiving circuit for attenuating oscillation in said antenna circuit when said receiving circuit detects the receive signal; and a transmitting circuit connected to said CPU and said antenna circuit for coupling a transmit signal to said antenna circuit from said CPU.

2. An IC card according to claim 1 wherein said attenuation circuit includes means for inverting and feeding back the output signal to said antenna circuit.

3. An IC card according to claim 2 wherein said means for inverting and feeding back the output signal feeds back the output signal with inverted phase to said antenna circuit when the output signal is negative relative to a reference voltage.

4. An IC card according to claim 1 wherein said attenuation circuit includes means for attenuating oscillation of electrical signals in said antenna circuit when the transmit signal is turned off.

5. An IC card according to claim 4 wherein a transmit signal is a digital signal composed of pulses of fixed duration and said transmitting circuit includes means for controlling the transmit signal output to said antenna circuit to be ON in a first half of a pulse and OFF in the second half of the pulse.

6. An IC card according to claim 1, wherein said antenna circuit includes a resonance circuit.

* * * * *